United States Patent
Norkus et al.

(10) Patent No.: US 6,910,671 B1
(45) Date of Patent: Jun. 28, 2005

(54) SHOCK MOUNT ASSEMBLY WITH POLYMERIC THIMBLE TUBE

(75) Inventors: James Norkus, Waterbury, CT (US); Randy Michael Bugnacki, Watertown, CT (US)

(73) Assignee: Illinois Tool Works Inc., Glenview, IL (US)

( * ) Notice: Subject to any disclaimer, the term of this patent is extended or adjusted under 35 U.S.C. 154(b) by 528 days.

(21) Appl. No.: 09/656,351

(22) Filed: Sep. 6, 2000

(51) Int. Cl.$^7$ .......................... B62D 27/04; F16M 13/00
(52) U.S. Cl. .................. 248/635; 248/638; 248/560
(58) Field of Search .................. 248/560, 562, 248/635, 638; 267/141.1, 141.2, 141.3, 141.4, 141.5; 296/35.1; 403/359.1, 359.2, 315, 316, 326, 327, 328, 329; 411/339, 508, 509

(56) References Cited

U.S. PATENT DOCUMENTS

| | | | | |
|---|---|---|---|---|
| 72,409 A | * | 12/1867 | Mason | 403/359.1 |
| 281,618 A | * | 7/1883 | Crowell | 403/359.1 |
| 3,193,237 A | | 7/1965 | Adams | 248/635 |
| 3,218,101 A | | 11/1965 | Adams | 248/635 |
| 3,343,770 A | * | 9/1967 | Szonn | 248/638 |
| 3,622,194 A | | 11/1971 | Bryk | 296/35.1 |
| 3,997,124 A | * | 12/1976 | Sato | 242/423.1 |
| 4,118,134 A | * | 10/1978 | Mansel | 403/359.1 |
| 4,196,895 A | * | 4/1980 | Sullivan | 248/560 |
| 4,541,612 A | | 9/1985 | Yohner | 251/308 |
| 4,720,075 A | | 1/1988 | Peterson et al. | 248/635 |
| 4,783,039 A | | 11/1988 | Peterson et al. | 248/635 |
| 4,921,203 A | * | 5/1990 | Peterson et al. | 248/635 |
| 5,031,266 A | * | 7/1991 | Tillman et al. | 403/329 |
| 5,170,985 A | | 12/1992 | Killworth et al. | 248/635 |
| 5,178,433 A | | 1/1993 | Wagner | 296/35.1 |
| 5,419,539 A | * | 5/1995 | Bressler | 267/292 |
| 5,570,867 A | | 11/1996 | Norkus | 248/635 |
| 5,735,511 A | * | 4/1998 | Stocker et al. | 267/140.13 |
| 6,062,763 A | | 5/2000 | Sirois et al. | 403/329 |
| 6,095,481 A | | 8/2000 | Norkus et al. | 248/560 |
| 6,158,726 A | * | 12/2000 | Coleman et al. | 267/292 |

* cited by examiner

Primary Examiner—Jon Szumny
(74) Attorney, Agent, or Firm—Mark W. Croll; Paul F. Donovan

(57) ABSTRACT

A shock mount assembly is provided, which generally includes a spacer and a thimble. The spacer includes a spacer flange and a spacer tube projecting from the spacer flange. The spacer tube includes an inwardly projecting shoulder having an inner diameter. The thimble includes a metal thimble base having a flange and an internally threaded post projecting from the flange. The threaded post has at least one hole passing through a wall thereof. The thimble also includes a plastic hollow thimble stem. The stem includes at least one hole passing through a wall of the lower portion thereof, the hole having a leg extending inwardly from one of the walls thereof. The leg includes a radially inwardly extending tab sized, shaped and positioned to engage the hole passing through the wall of the threaded post in a snap fitted arrangement when the threaded post is inserted into the stem. The stem also includes projecting from a top end thereof a plurality of fingers spaced about a periphery thereof. Each of the fingers has an outwardly projecting portion defining a circumferential lip having an outer diameter larger than the inner diameter of the shoulder of the spacer tube of said spacer. The stem is telescopically receivable in the spacer tube such that when the stem is fully inserted in the spacer tube, the lip engages the shoulder in a snap fitted

29 Claims, 6 Drawing Sheets

SHOCK MOUNT ASSEMBLY WITH POLYMERIC THIMBLE TUBE

FIELD OF THE INVENTION

The present invention relates to an improved shock mount assembly for securing a heavy structure, such as a vehicle body, to a support, such as the frame of a vehicle, and absorbing vibrations or shocks between the two structures.

BACKGROUND OF THE INVENTION

A shock mount currently used in the automotive industry to secure truck bodies to truck frames is disclosed in U.S. Pat. Nos. 4,783,039 and 4,720,075 to Peterson et al., the disclosures of which are hereby incorporated by reference. This shock mount has been successful in the industry due to its design features which provide a telescoping metal spacer and metal thimble assembly that snap together to hold the thimble and spacer together until secured with a threaded fastener, and in which the thimble and spacer have mating surfaces to prevent either one from rotating relative to the other, thereby permitting fastening of the threaded fastener with minimal undesirable rotation of one element relative to the other.

While this known shock mount is exceptionally effective and has high strength characteristics, it does not allow for variations in strength requirements. For example, in some instances an automotive or truck manufacturer may specify that the shock mount will not separate in a barrier test, i.e, that the shock mount will not separate when the vehicle in which it is used impacts a barrier at a certain speed. In other instances, the vehicle manufacturer may specify that the shock mount will separate during a barrier test at certain speeds. Such a specification can arise when the vehicle manufacturer is designing crash protection features in which the energy of a crash is dissipated by destruction or separation of various components of the vehicle body. In such case, each shock mount must be separately designed and manufactured, increasing product cost.

These problems were addressed by the shock mount disclosed in U.S. Pat. No. 5,570,867 to Norkus, the disclosure of which is hereby incorporated by reference. This shock mount includes intermitting flanged spacer and thimble members and resilient rings mounted thereto. the thimble is formed from a hollow plastic stem and a metal base. The metal base includes a flange and an internally threaded post. The thimble stem fits over and snaps onto the post. The metal base member is made in either a high strength or low strength configuration. Selection of the appropriate configuration of base member provides a shock mount assembly of the desired separation strength.

While this shock mount design provides excellent results, it suffers from a disadvantage of its own. In order to join the thimble and the spacer together, a plurality of inward protrusions, such as formed on a tabbed washer, are fitted inside the spacer tube so as to engage the tip of the thimble stem when the thimble stem is telescopingly fitted inside the spacer tube. This arrangement requires the manufacture of an additional piece, which consequently adds to the cost of manufacturing the shock mount. Moreover, the provision of inward protrusion may lead to an increased incidence of manufacturing failures, as when the thimble stem is inserted into the spacer tube, one or more of the protrusions may not bend inwardly properly, resulting in a skewed or failed insertion. Furthermore, even if the thimble stem appears to have been inserted properly, the inward protrusions may not properly engage the lip on the thimble stem, thereby lowering the retention force.

What is desired, therefore, is a shock mount assembly which requires less components than known designs, which has a lower cost of manufacture than known designs, which has a lower incidence of manufacturing failures than known designs, and which has a consistently high retention force between components.

SUMMARY OF THE INVENTION

Accordingly, it is an object of the present invention to provide a shock mount assembly which requires less components than known designs.

Another object of the present invention is to provide a shock mount assembly having the above characteristics and which has a lower cost of manufacture than known designs.

A further object of the present invention is to provide a shock mount assembly having the above characteristics and which has a lower incidence of manufacturing failures than known designs.

Still another object of the present invention is to provide a shock mount assembly having the above characteristics and which has a consistently high retention force between components.

These and other objects of the present invention are achieved by provision of a shock mount assembly for securing a mounting part of a structure onto a support, which generally includes a spacer and a thimble. The spacer includes a spacer flange and a spacer tube projecting from the spacer flange.

The spacer tube includes an inwardly projecting shoulder having an inner diameter. The thimble includes a metal thimble base having a flange and an internally threaded post projecting from the flange. The threaded post has at least one hole passing through a wall thereof. The thimble also includes a plastic hollow thimble stem.

The stem includes at least one hole passing through a wall of the lower portion thereof, the hole having a leg extending inwardly from one of the walls thereof. The leg includes a radially inwardly extending tab sized, shaped and positioned to engage the hole passing through the wall of the threaded post in a snap fitted arrangement when the threaded post is inserted into the stem. The stem also includes projecting from a top end thereof a plurality of fingers spaced about a periphery thereof. Each of the fingers has an outwardly projecting portion defining a circumferential lip having an outer diameter larger than the inner diameter of the shoulder of the spacer tube of said spacer. The stem is telescopically receivable in the spacer tube such that when the stem is fully inserted in the spacer tube, the lip engages the shoulder in a snap fitted arrangement.

Preferably, the circumferential lip includes at an upper and outer edge thereof a tapered portion to facilitate the insertion of the stem into the spacer tube. Also preferably, the inwardly projecting shoulder is integrally formed as part of the spacer tube.

The outer wall of the threaded post is preferably generally cylindrical and the lower portion of the stem has a mating cylindrical inner wall. The outer wall of the threaded post includes at least one longitudinal channel therealong, and the inner wall of the stem includes at least one inwardly extending protrusion sized, shaped and positioned to engage the at least one channel when the threaded post is inserted into the stem in order to inhibit relative rotation of the stem and post.

The invention and its particular features and advantages will become more apparent from the following detailed description considered with reference to the accompanying drawings.

DETAILED DESCRIPTION OF THE INVENTION

Referring first to FIGS. 1–8, wherein like numerals indicate like elements in the drawings, an improved shock isolating mount 10 in accordance with one embodiment of the invention is shown. Shock isolating mount 10 (also referred to herein as a "shock mount") comprises a spacer 12 and a thimble 14. Thimble 14 comprises a base 16 and a stem 18. A fastener 20 is provided to secure together the shock mount 10.

Figures 1, 2:
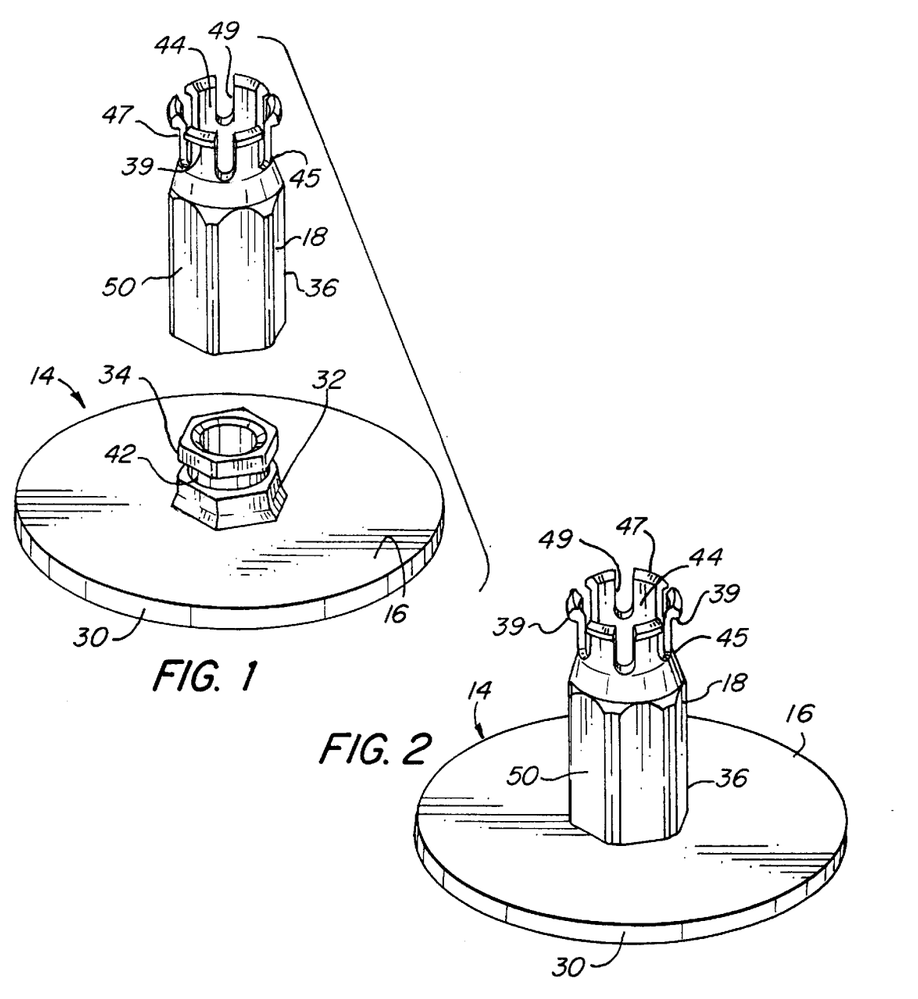
FIG. 1 is an exploded perspective view of an embodiment of a thimble of a shock mount assembly in accordance with the present invention.
FIG. 2 is an assembled perspective view of the thimble of FIG. 1.
Figures 3, 4, 5, 6:
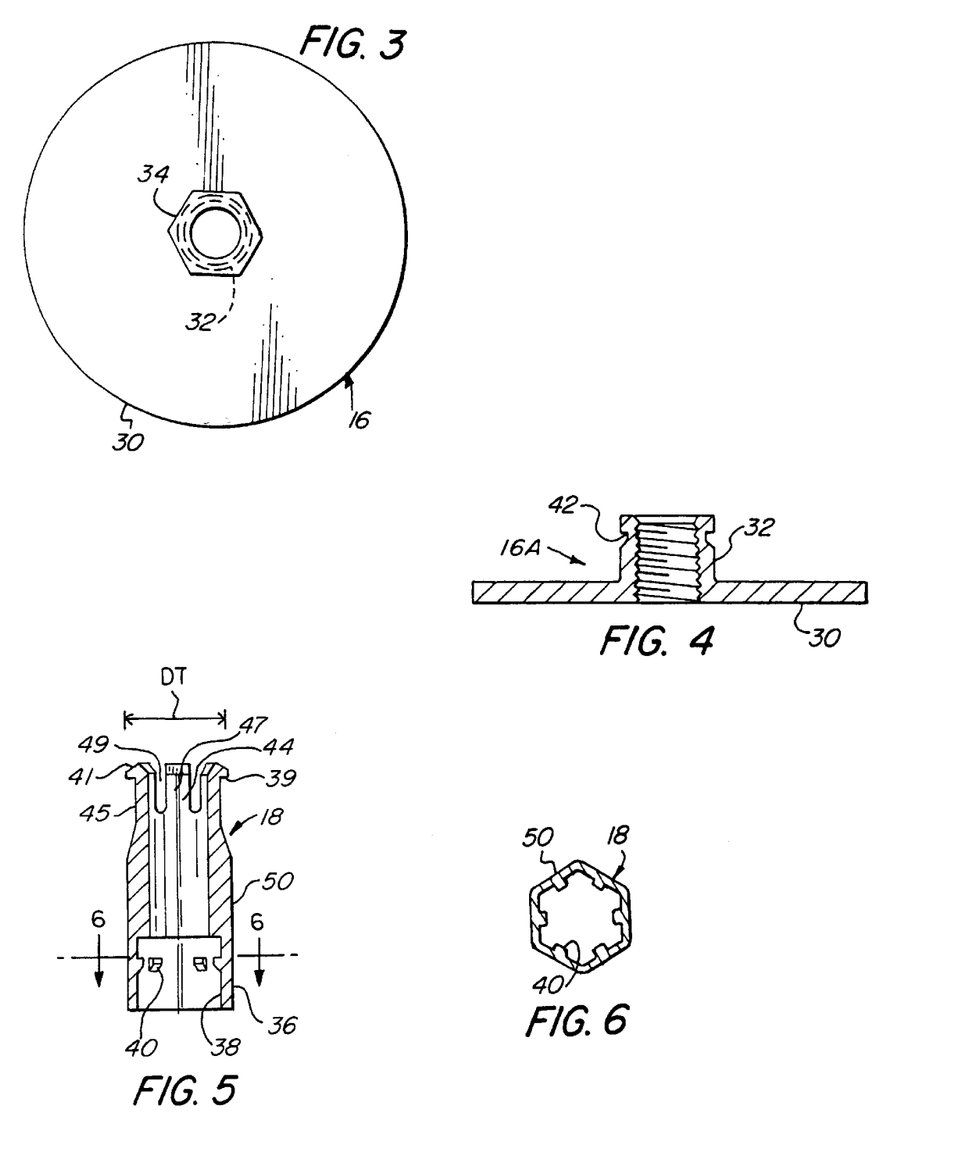
FIG. 3 is a top plan view of a base of the thimble of FIG. 1.
FIG. 4 is a partially cross-sectional view of a first embodiment of a base of the thimble of FIG. 1.
FIG. 5 is a partially cross-sectional view of a stem of the thimble of FIG. 1.
FIG. 6 is a partially cross-sectional view of the stem taken along the line 6—6 of FIG. 5.

The base 16 of thimble 14 is a metal part having an annular flange 30 and an internally threaded post 32 integrally formed with and projecting from flange 30. In this embodiment, the outer wall 34 of post 32 is non-circular in cross-section; preferably outer wall 34 is hexagonal in cross-section.

Stem 18 is a plastic part, preferably formed from a thermoplastic polymer. Stem 18 is hollow, and has a lower portion 36 that, in this embodiment, has an inner wall 38 with a non-circular cross-section, preferably a hexagonal cross-section. Lower portion 36 of stem 18 receives the post 32 when base 16 and stem 18 are fitted together. The outer wall 34 of post 32 and the inner wall 38 of lower portion 36 of stem 18 interfit with each other to prevent relative rotation of the base 16 and stem 18.

Base 16 and stem 18 are provided with mating means for securing stem 18 to base 16. In the embodiment shown in FIGS. 1–8, the mating means preferably comprises at least one tab 40, and most preferably six such tabs 40, extending radially inwardly from the inner wall 38 of the lower portion 36 of stem 18, and a slot 42 formed on the outer wall 34 of post 32 for receiving said tabs 40. Slot 42 most preferably extends around the entire perimeter of outer wall 34 of post 32. Tabs 40, being formed with the stem 18, have a resilient characteristic, so that the stem 18 may be snap fitted onto post 32 and retained by the engagement of tabs 40 in the slot 42.

Stem 18 is provided with a plurality of fingers 47 in its upper portion 45 having cutouts 49 therebetween. Each of fingers 47 includes, at a top edge thereof, a circumferential outwardly projecting lip 39, the upper and outer edge thereof having a tapered portion 41. The function of fingers 47 is set forth in more detail below.

Fingers 47 define a circular guide hole 44. Guide hole 44 is sized to receive the threaded fastener 20 with only a small amount of clearance. Guide hole 44 serves to guide threaded portion 46 of fastener 20 in proper alignment with the internally threaded portion of post 32, to minimize potential for cross-threading of fastener 20 when it is being secured into the post 32.

Figure 7:
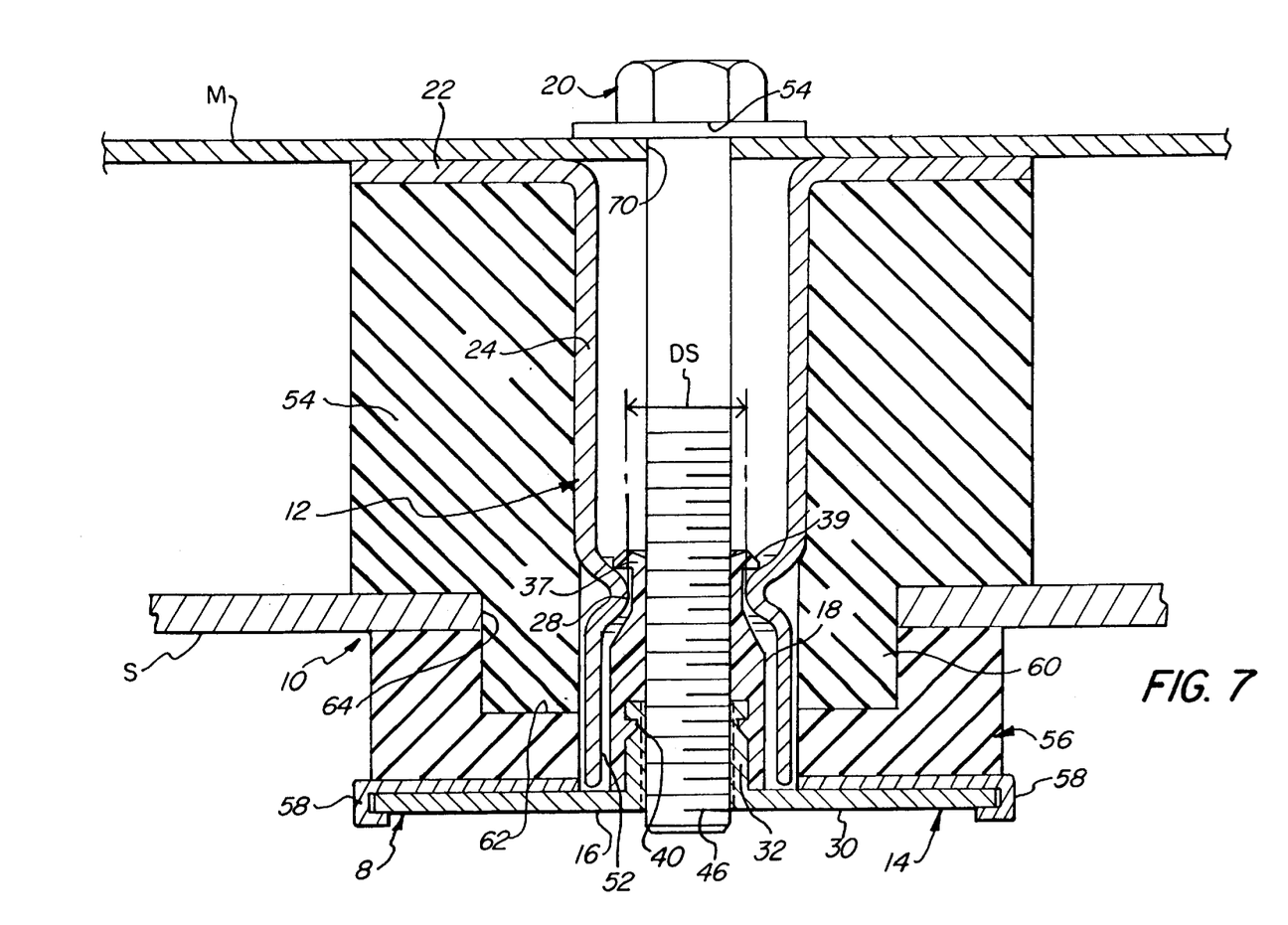
FIG. 7 is a partially cross-sectional view of an embodiment of an assembled shock isolating mount in accordance with the present invention.
Figure 8:
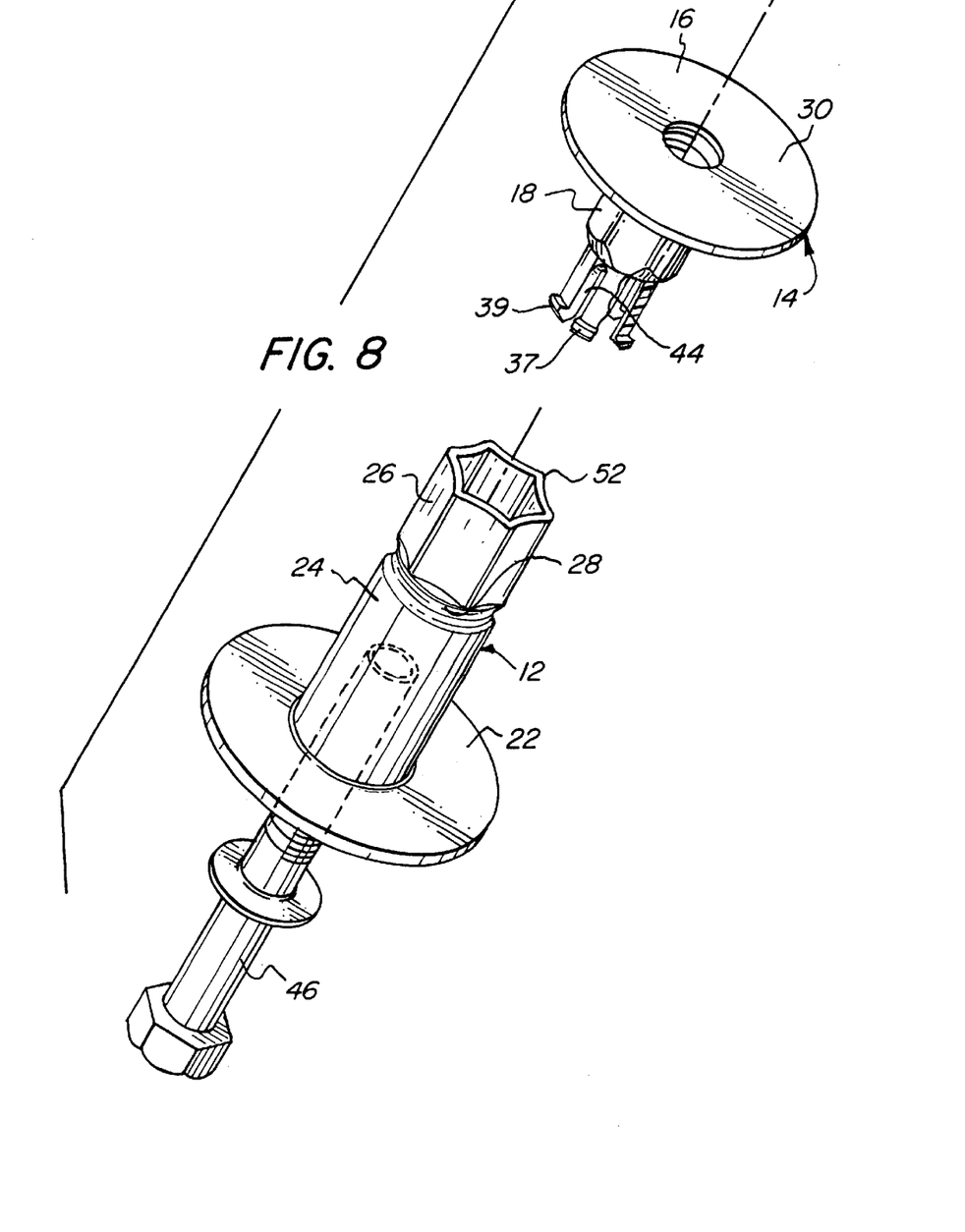
FIG. 8 is an exploded view of portions of the shock isolating mount of FIG. 7.

Spacer 12 has an annular flange 22 integral with a spacer tube 24 extending perpendicularly from the flange 22, and is formed from steel or other rigid high strength materials. A portion 26 of the tube 24 opposite the flange 22 is formed to be non-circular in cross-section, preferably hexagonal in cross-section. Spacer tube 24 also includes an inwardly projecting shoulder 28 having an inner diameter DS which is less than an outer diameter DT of the lip 39 of fingers 37 of thimble stem 18. Shoulder 28 is longitudinally positioned along spacer tube 24 such that when the thimble stem 18 is telescopically fitted inside spacer tube 24, lip 39 of fingers 37 contacts shoulder 28. As thimble stem 18 is forced further inward, shoulder 28 forces fingers 37, which, being formed with the stem 18, have a resilient characteristic, inwardly until lip 39 clears shoulder 28. At this point, fingers 37 are forced back outwardly, thereby causing lip 39 and shoulder 28 to be maintained in a snap fitted engagement. Tapered portion 41 of lip 39 is provided to facilitate the insertion of lip 39 past shoulder 28.

The shock mount 10 of the invention, in addition to the above described elements, preferably also comprises mating surfaces formed on the outer wall 50 of stem 18 and on the inner wall 52 of spacer tube 24 to prevent rotation of the thimble 14 relative to the spacer 12 when the thimble stem 18 is received in the spacer tube 24.

In addition, shock mount 10 is preferably further provided with a first elastically resilient ring 54 fitted onto the spacer tube, and a second elastically resilient ring 56 secured to the flange 30 of base 16 by tabs 58. Preferably, rings 54 and 56 are provided with a mating projecting portion 60 and cavity 62. It is preferable that the projecting portion 60 and cavity 62, and the aperture 64 in support S through which the projecting portion 60 extends, be non-circular, to prevent rotation of the resilient rings 54 and 56 when the shock mount is assembled together to mount the mounting part M to support S.

It is to be appreciated that the various interfitting parts of non-circular cross-section described in this application may be oblong, oval, polygonal (including triangular, square, and pentagonal, and potentially, with greater numbers of sides), or even circular provided that one or both of the parts is provided with one or more teeth or keys fitting into a mating slot or aperture, all for the purpose of limiting relative rotation of the two parts.

Use of the shock mount of the present invention will be typically in accordance with the following procedure. The shock mount components will be partially preassembled for subsequent use on an automotive and/or truck assembly line by mounting stems 18 to the selected bases 16 and by mounting the resilient rings 54 and 56 to the spacer 12 and thimble 14 respectively.

When the shock mount is to be used on an assembly line, the manufacturing personnel will place the spacer 12 and thimble 14 on opposite sides of the support S and secure them together by fitting the end of thimble 14 into spacer tube 24 until the lip 39 of thimble 14 is engaged by shoulder 28. This will hold the thimble and spacer together until secured with fastener 20. Thereafter, the mounting part M is placed adjacent the spacer flange 22 and the fastener 20 is inserted through a hole in part M and through the spacer 12 to thread into and be secured to the threaded portion of post 32, thereby fastening the mounting part M to support S.

The present invention provides a shock isolating mount 10 that can be adapted to give a selected separation strength by selecting a base 16 with a desired separation strength. The desired separation strength of base 16 is determined by the force required to shear post 32 from flange 30. It is to be appreciated that if post 32 is sheared from flange 30, the assembly as shown in FIG. 7 will no longer provide a secure connection between the support S and mounting part M, thus permitting these parts to separate when subjected to sufficient force.

In a preferred embodiment, where it is desired that the shock mount fit into one of two categories of (1) shock mounts which will separate when subjected to a certain force arising from vehicle impact against a barrier, and (2) shock mounts which will not separate when subjected to the same force, the base 16 will be selected respectively from one of two groups: (1) bases with a low separation strength and (2) bases with a high separation strength.

Figures 9, 10A, 10B:
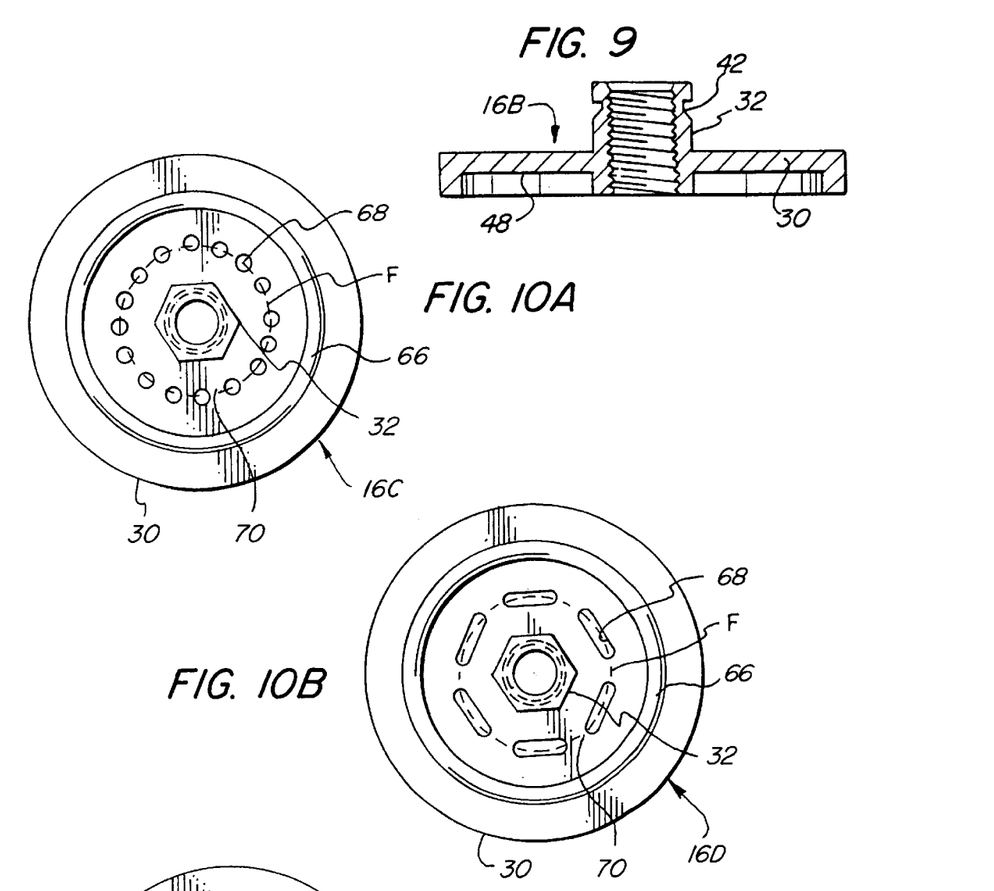
FIG. 9 is a partially cross-sectional view of another embodiment of a base of the thimble of FIG. 1.
FIGS. 10A–10C are plan views of other embodiments of bases of the thimble of FIG. 1.

In its simplest form a base 16A with a low separation strength is shown in FIG. 4 and has a flange 30 having a thickness of less than 0.125 inch. A base 16B with a higher separation strength is shown in FIG. 9 and has a flange 30 having a thickness equal to or greater than 0.125 inch. Base 16B in FIG. 9 also is provided with a plurality of strengthening ribs 48. Ribs 48 are integrally formed in the lower portion of base 16B and preferably extend radially from the center of the base to its perimeter edge.

While the thimble base 16 designs shown in FIGS. 4 and 9 provide some flexibility as to the separation strength, in that either the high strength or the low strength configuration can be used, accommodating multiple separation strengths would require that base members having multiple configurations be manufactured. This can be avoided by employing the embodiments of base 16 shown in FIGS. 10A–10C. In these embodiments, instead of radially extending ribs 48, thimble flange 30 is formed with a raised annular ring 66 located on the axial face of flange 30 opposite the threaded post 32. Passing through thimble flange 30 between threaded post 32 and raised ring 66 are a plurality of perforations 68. Although perforations 68 preferably take the form of circular holes (shown in FIG. 10A with respect to base 16C), they may be formed as elongated slots (shown in FIG. 10B with respect to base 16D), curved elongated slots (shown in FIG. 10C with respect to base 16E), or any of numerous other shapes, so long as they pass completely through thimble flange 30. Perforations 68 are also preferably equally spaced radially about threaded post 32, although such placement is not required.

Perforations 68 passing through thimble flange 30 define a fracture line (illustrated as dashed line F in FIGS. 10A–10C) along the webs 70 of thimble flange 30 between perforations 68. When an impact force is applied which exceeds the separation strength, the forces are concentrated along fracture line F, which results in the fracture of webs 70 and separation of the structure and the support. The separation strength can be easily varied by varying the size of, number of, position of, shape of, location of, or spacing of the perforations 68. For example, by adding perforations, the amount of material (i.e. the size of webs 70) maintaining the attachment of threaded post 32 to the majority of thimble flange 30 is reduced, thereby reducing the separation strength of the shock isolating mount. A similar result can be obtained by increasing the size of the perforations or by using elongated perforations.

Figure 10C:
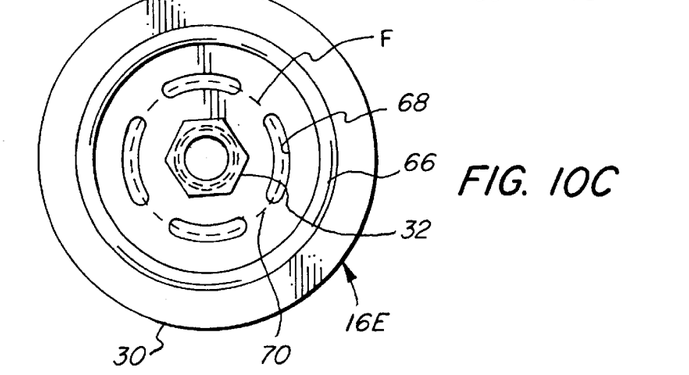

It has been found that by providing perforations 68, the separation strength of each production unit is much more precise than if perforations are not used. This is so because perforations 68 define a fracture line F, along which each unit will fail. If no perforations are provided, no fracture line is defined, and each production unit may fail along a different fracture line, which may depend on slight variations in material gage or chemistry, and which may lead to greatly differing separation strengths even among production units of the same configuration.

The above design provides the ability for shock mounts to be provided with different separation strengths depending on requirements by the selection of the appropriate base 16. This permits standardization of all components of the shock mount 10, except for the base 16. This is an advantage, in particular because it provides significant flexibility to provide a base 16 of any desired strength.

Referring now to FIGS. 11–15, another embodiment of the present invention is shown, in which an alternate mating means for securing stem 18 to base 16 is provided. In this embodiment, rather than outer wall 34' of threaded post 32' being polygonal, outer wall 34' is substantially cylindrical and includes a plurality of longitudinal channels 72 therealong. Preferably, channels 72 extend from a top edge 74 of threaded post 32' and along substantially the entire length thereof. Threaded post 32' also includes at least one, and preferably two, holes 76 passing through a wall thereof at a distance from top edge 74. Preferably, channels 74 and holes 76 are equally spaced about threaded post 32', and most preferably, four channels 74 and two holes 76 are provided.

Figures 11, 12, 13, 14, 15:
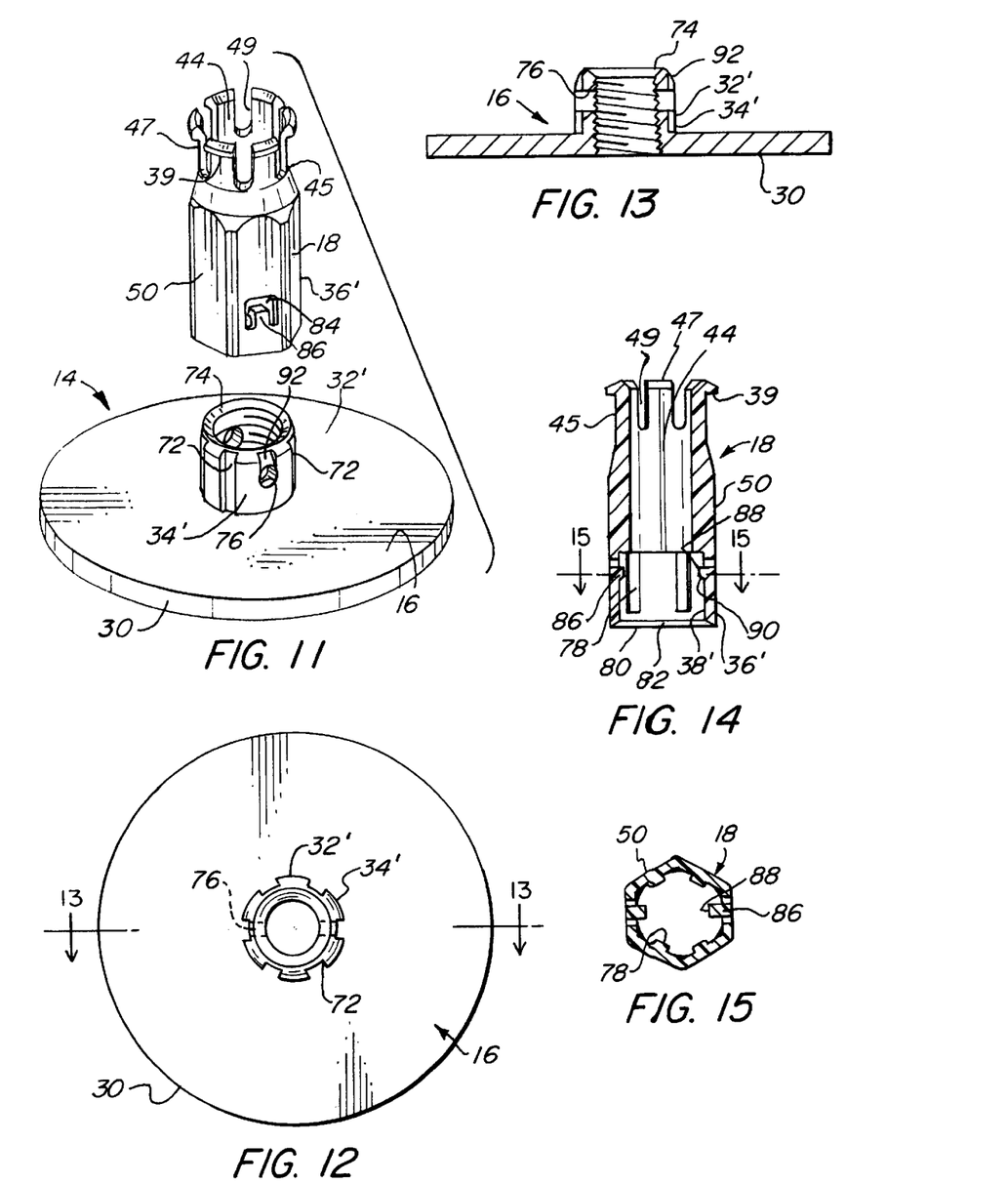
FIG. 11 is an exploded perspective view of another embodiment of a thimble of a shock mount assembly in accordance with the present invention.
FIG. 12 is a top plan view of a base of the thimble of FIG. 11.
FIG. 13 is a partially cross-sectional view of an embodiment of a base of the thimble of FIG. 11.
FIG. 14 is a partially cross-sectional view of a stem of the thimble of FIG. 11.
FIG. 15 is a partially cross-sectional view of the stem taken along the line 15—15 of FIG. 14.

Also, in this embodiment, inner wall 38' of lower portion 36' of stem 18 is substantially cylindrical rather than being polygonal in order to correspond with outer wall 34' of threaded post 32'. Inner wall 38' includes a plurality of inwardly. extending, laterally elongated protrusions 78 which are sized, shaped and positioned to correspond with the plurality of longitudinal channels 72 in outer wall 34' of threaded post 32' Preferably, protrusions 78 are spaced a distance from a lower edge 80 of lower portion 36' of stem 18. This is preferable so that when stem 18 and base 16 are being joined, threaded post 32' can be partially inserted into stem 18, and then stem 18 and base 16 can be rotated relative to each other to properly align protrusions 78 and channels 72. Also, lower edge 80 of lower portion 36' of stem preferably includes a tapered portion 82 to facilitate the insertion of threaded post 32' into stem 18.

Lower portion 36' of stem 18 also preferably includes at least one, and preferably two, holes 84. Extending inwardly from one of the walls of holes 84 are legs 86, which include radially inwardly extending tabs 88, which are sized, shaped and positioned to engage holes 76 in threaded post 32' upon full insertion of threaded post 32' into stem 18. Preferably, tabs 88 include tapered portion 90, and the space between holes 76 and top edge 74 of threaded post 32' include tapered portion 92 to facilitate the bending outward of legs 86 as threaded post 32' is inserted into stem 18. Once fully inserted, legs 86 which, being formed with the stem 18, have a resilient characteristic are snap fitted into holes 76 and retained by the engagement of tabs 88 into holes 76. Relative rotation between stem 18 and base 16 is inhibited by the engagement of tabs 88 into holes 76, as well as by the engagement of protrusions 78 in channels 72.

The present invention, therefore, provides a shock mount assembly which requires less components than known designs, which has a lower cost of manufacture than known designs, which has a lower incidence of manufacturing failures than known designs, and which has a consistently high retention force between components.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A shock isolating mount for securing a mounting part of a structure onto a support, said shock isolating mount comprising:
    a one-piece rigid spacer having a spacer flange and a spacer tube projecting from the spacer flange, the spacer tube having a homogenously formed, inwardly projecting shoulder having an inner diameter;
    a thimble comprising:
        a metal thimble base having a flange and an internally threaded post projecting from the flange, and
        a plastic hollow thimble stem, said stem and said base having mating means for securing said stem to said base, said stem having projecting from a top end thereof a plurality of fingers spaced about a periphery thereof, each of the fingers having an outwardly projecting portion defining a circumferential lip having an outer diameter larger than the inner diameter of the shoulder of the spacer tube of said spacer; and
    wherein the stem is telescopically receivable in the spacer tube such that when the stem is fully inserted in the spacer tube, the lip engages the shoulder in a snap fitted arrangement.

2. The shock isolating mount of claim 1 wherein the threaded post is fittable into a lower portion of the stem, and the mating means for securing the stem to the base comprises:
    at least one hole passing through a wall of the lower portion of the stem, the hole having a leg extending inwardly from one of the walls thereof, the leg having a radially inwardly extending tab; and
    at least one hole passing through a wall of the threaded post, said hole being sized, shaped and positioned to retain the tab in a snap fitted arrangement when the threaded post is inserted into the stem.

3. The shock isolating mount of claim 2 wherein the outer wall of the threaded post is generally cylindrical and the lower portion of the stem has a mating cylindrical inner wall, wherein the outer wall of the threaded post includes at least one longitudinal channel therealong, and wherein the inner wall of the stem includes at least one inwardly extending protrusion sized, shaped and positioned to engage the at least one channel when the threaded post is inserted into the stem in order to inhibit relative rotation of the stem and post.

4. The shock isolating mount of claim 1 wherein the base further comprises a plurality of axial strengthening ribs.

5. The shock isolating mount of claim 1 wherein the flange of said thimble base includes a plurality of perforations passing therethrough surrounding the threaded post.

6. The shock isolating mount of claim 5 wherein the perforations comprise a plurality of perforations equally spaced radially about the threaded post.

7. The shock isolating mount of claim 5 wherein the flange of said thimble base further comprises a raised annular ring surrounding the perforations.

8. The shock isolating mount of claim 1 wherein the threaded post is fittable into a lower portion of the stem, and the mating means for securing the stem to the base comprises at least one tab extending radially inwardly from an inner wall of the lower portion of the stem, and a slot formed in an outer wall of the post for receiving the at least one tab.

9. The shock isolating mount of claim 8 wherein the at least one tab comprises six of tabs extending radially inwardly from the inner wall of the stem, and wherein the slot extends around an entire perimeter of the outer wall of the threaded post.

10. The shock isolating mount of claim 9 wherein the outer wall of the threaded post is generally non-circular in cross-section, and wherein the lower portion of the stem has a mating non-circular cross-section, the post being fittable into the lower portion of the stem, whereby relative rotation of the stem and post is inhibited by mating of the non-circular cross-sections of the threaded post and the stem.

11. The shock isolating mount of claim 10 wherein the outer wall of the threaded post and the lower portion of the stem are generally hexagonal in cross-section.

12. The shock isolating mount of claim 1 wherein the circumferential lip includes at an upper and outer edge thereof a tapered portion to facilitate the insertion of the stem into the spacer tube.

13. A shock isolating mount for securing a mounting part of a structure onto a support, the shock isolating mount comprising:
    a one-piece spacer having a flange and a spacer tube projecting from the flange, the spacer tube having an inwardly projecting shoulder homogenously formed therein;
    a thimble comprising a base and a stem projecting from the base, the stem having a lower portion which engages the base, and an upper portion having a plurality of spaced apart resilient fingers, each of the fingers having an outwardly projecting portion so as to collectively define a lip; and
    wherein the stem is telescopically receivable in the spacer tube, such that when the stem is fully inserted in the spacer tube, the lip engages the shoulder in a snap fitted arrangement.

14. A shock insolating mount for securing a mounting part of a structure onto a support, said shock isolating mount comprising:
    a one-piece rigid spacer having a spacer flange and a spacer tube projecting from the spacer flange, the spacer tube having a homogeneously formed, inwardly projecting shoulder having an inner diameter;

a thimble comprising:
  a metal thimble base having a flange and an internally threaded post projecting from the flange, the threaded post having at least one hole passing through a wall thereof, and
  a plastic hollow thimble stem, said stem including at least one hole passing through a wall of the lower portion thereof, the hole having a leg extending inwardly from one of the walls thereof, the leg having a radially inwardly extending tab sized, shaped and positioned to engage the hole passing through the wall of the threaded post in a snap fitted arrangement when the threaded post is inserted into the stem, said stem having projecting from a top end thereof a plurality of fingers spaced about a periphery thereof, each of the fingers having an outwardly projecting portion defining a circumferential lip having an outer diameter larger than the inner diameter of the shoulder of the spacer tube of said spacer; and
  wherein the stem is telescopically receivable in the spacer tube such that when the stem is fully inserted in the spacer tube, the lip engages the shoulder in a snap fitted arrangement.

15. The shock isolating mount of claim 14 wherein the circumferential lip includes at an upper and outer edge thereof a tapered portion to facilitate the insertion of the stem into the spacer tube.

16. The shock isolating mount of claim 14 wherein the outer wall of the threaded post is generally cylindrical and the lower portion of the stem has a mating cylindrical inner wall, wherein the outer wall of the threaded post includes at least one longitudinal channel therealong, and wherein the inner wall of the stem includes at least one inwardly extending protrusion sized, shaped and positioned to engage the at least one channel when the threaded post is inserted into the stem in order to inhibit relative rotation of the stem and post.

17. The shock isolating mount of claim 13 wherein the base of the thimble includes a plurality of perforations extending therethrough, the perforations being arranged to define a fracture line along which the shock isolating mount is designed to fail when a certain amount of force is applied thereto.

18. A shock insolating mount for securing a mounting part of a structure onto a support, said shock isolating mount comprising:
  a one-piece rigid spacer having a spacer flange and a spacer tube projecting from the spacer flange, the spacer tube having a homogeneously formed, inwardly projecting shoulder;
  a thimble comprising:
    a metal thimble base having a flange and an internally threaded post projecting from the flange, the threaded post having at least one hole passing through a wall thereof, and
    a plastic hollow thimble stem, said stem including at least one hole passing through a wall of the lower portion thereof, the hole having a leg extending inwardly from one of the walls thereof, the leg having a radially inwardly extending tab sized, shaped and positioned to engage the hole passing through the wall of the threaded post in a snap fitted arrangement when the threaded post is inserted into the stem; and
    wherein the stem is telescopically receivable in the spacer tube such that when the stem is fully inserted in the spacer tube, an outer surface of the stem engages the shoulder of the spacer tube in a snap fitted arrangement.

19. The shock isolating mount of claim 18 wherein the tab includes a tapered portion, and the threaded post includes a tapered portion between the hole therein and a top edge thereof, for facilitating insertion of the threaded post into the stem.

20. The shock isolating mount of claim 18 wherein the outer wall of the threaded post is generally cylindrical and the lower portion of the stem has a mating cylindrical inner wall, wherein the outer wall of the threaded post includes at least one longitudinal channel therealong, and wherein the inner wall of the stem includes at least one inwardly extending protrusion sized, shaped and positioned to engage the at least one channel when the threaded post is inserted into the stem in order to inhibit relative rotation of the stem and post.

21. The shock isolating mount of claim 18 wherein the upper and outer edge of the outer wall of the threaded post includes a tapered portion and a lower and inner edge of the inner wall of the lower portion of the stem includes a tapered portion to facilitate insertion of the threaded post into the stem.

22. The shock isolating mount of claim 20 wherein the at least one inwardly extending protrusion is spaced a distance from a lower edge of the lower portion of the stem such that as the stem and the base are being joined, the threaded post can be partially inserted into the stem and the stem and the base can be rotated relative to each other to properly align the inwardly extending protrusions with the channels.

23. The shock isolating mount of claim 20 wherein the at least one radially inwardly extending tab comprises two radially inwardly extending tabs, wherein the at least one inwardly extending protrusion comprises four inwardly extending protrusions, and wherein the tabs and protrusions are equally spaced radially about the inner wall of the stem.

24. The shock isolating mount of claim 18 wherein said stem includes projecting from a top end thereof a plurality of fingers spaced about a periphery thereof, each of the fingers having an outwardly projecting portion defining a circumferential lip having an outer diameter larger than the inner diameter of the shoulder of the spacer tube, and wherein the stem is retained within the spacer tube by a snap fitted arrangement of the lip engaging the shoulder.

25. The shock isolating mount of claim 24 wherein the circumferential lip includes at an upper and outer edge thereof a tapered portion to facilitate the insertion of the stem into the spacer tube.

26. The shock isolating mount of claim 18 wherein the base further comprises a plurality of axial strengthening ribs.

27. The shock isolating mount of claim 18 wherein the flange of said thimble base includes a plurality of perforations passing therethrough surrounding the threaded post.

28. The shock isolating mount of claim 27 wherein the perforations comprise a plurality of perforations equally spaced radially about the threaded post.

29. The shock isolating mount of claim 28 wherein the flange of said thimble base further comprises a raised annular ring surrounding the perforations.

* * * * *